US009176776B2

(12) United States Patent
Hori et al.

(10) Patent No.: US 9,176,776 B2
(45) Date of Patent: Nov. 3, 2015

(54) APPARATUS, METHOD, AND COMPUTER-READABLE RECORDING MEDIUM FOR PROCESSING DATA

(71) Applicants: Seijiro Hori, Tokyo (JP); Atsuko Yagi, Kanagawa (JP); Ayumi Mihara, Tokyo (JP); Takayori Nishida, Tokyo (JP); Mitsuhiko Hirose, Tokyo (JP)

(72) Inventors: Seijiro Hori, Tokyo (JP); Atsuko Yagi, Kanagawa (JP); Ayumi Mihara, Tokyo (JP); Takayori Nishida, Tokyo (JP); Mitsuhiko Hirose, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/474,381

(22) Filed: Sep. 2, 2014

(65) Prior Publication Data
US 2015/0082320 A1    Mar. 19, 2015

(30) Foreign Application Priority Data

Sep. 17, 2013  (JP) .................................. 2013-192243

(51) Int. Cl.
*H04N 1/04* (2006.01)
*G06F 9/48* (2006.01)
(52) U.S. Cl.
CPC .................... *G06F 9/4881* (2013.01)
(58) Field of Classification Search
CPC ...................................................... G06F 9/4881

USPC ................................. 358/1.14, 1.18, 1.9, 474
See application file for complete search history.

(56) References Cited

U.S. PATENT DOCUMENTS

| 7,924,442 | B2 * | 4/2011 | Watabe .......................... 358/1.1 |
| 8,179,542 | B2 | 5/2012 | Yagi | |
| 2014/0195585 | A1 | 7/2014 | Mihara | |

FOREIGN PATENT DOCUMENTS

| JP | 2008-097586 | 4/2008 |
| JP | 2014-127066 | 7/2014 |
| JP | 2014-134873 | 7/2014 |

* cited by examiner

Primary Examiner — Houshang Safaipour
(74) Attorney, Agent, or Firm — IPUSA, PLLC

(57) ABSTRACT

A data processing apparatus includes a first storage that stores information pertaining to an order in which multiple process flows are executed, the execution of the multiple process flows being started by input of data and terminated by output of the data in a format usable for a user, a reception part that receives input data with respect to one of the multiple process flows, an execution part that executes the one of the multiple process flows on the input data, and a second storage that stores information indicating the one of the multiple process flows executed by the execution part. The execution part identifies a predetermined process flow to be executed with respect to the input data by referring to the first and second storages. The predetermined process flow is a process flow to be performed earliest among the multiple process flows that are not yet executed.

9 Claims, 11 Drawing Sheets

FIG.8

| FLOW-SET ID | FLOW-SET CONFIGURATION |
|---|---|
| shinseisho | F001 -> F002 -> F003 -> F004 |
| : | : |

FIG.9

| FLOW ID | STATUS |
|---|---|
| F001 | NOT EXECUTED |
| F002 | NOT EXECUTED |
| F003 | NOT EXECUTED |
| F004 | NOT EXECUTED |

FIG.10

| FLOW ID | FLOW CONFIGURATION |
|---------|--------------------|
| F001 | In_Plug_001 -> Out_Plug_001 |
| F002 | In_Plug_004 -> Con_Plug_001 -> Out_Plug_003 |
| F003 | In_Plug_003 -> Out_Plug_004 |
| F004 | In_Plug_005 -> Out_Plug_002 |

FIG.11

| PLUG-IN ID | PLUG-IN TYPE | SETTING INFORMATION | DEVICE ID |
|---|---|---|---|
| In_Plug_001 | FOLDER INPUT | FOLDER-PATH A··· | DeviceID_4 |
| In_Plug_002 | FOLDER INPUT | FOLDER-PATH B··· | DeviceID_1 |
| In_Plug_003 | MAIL INPUT | FLOW ADDRESS··· | DeviceID_3 |
| In_Plug_004 | SCAN INPUT | RESOLUTION DOUBLE-SIDE /SINGLE SIDE COLOR/MONOCHROME ··· | DeviceID_1 |
| In_Plug_005 | SCAN INPUT | RESOLUTION DOUBLE-SIDE /SINGLE SIDE COLOR/MONOCHROME ··· | DeviceID_2 |
| ⋮ | ⋮ | ⋮ | ⋮ |
| Con_Plug_001 | OCR | RESOLUTION OCR LANGUAGE··· | |
| ⋮ | ⋮ | ⋮ | ⋮ |
| Out_Plug_001 | PRINTING DISTRIBUTION | COLOR/MONOCHROME N-UP SETTING ON/OFF··· | DeviceID_1 |
| Out_Plug_002 | DOCUMENT DISTRIBUTION | PATH OF DISTRIBUTION DESTINATION USER NAME··· | DeviceID_4 |
| Out_Plug_003 | MAIL DISTRIBUTION | ADDRESS··· | DeviceID_3 |
| Out_Plug_004 | PRINTING DISTRIBUTION | COLOR/MONOCHROME N-UP SETTING ON/OFF··· | DeviceID_2 |
| ⋮ | ⋮ | ⋮ | ⋮ |

FIG.12

| Device ID | DEVICE TYPE | DEVICE INFORMATION |
|---|---|---|
| DeviceID_1 | MFP | ADDRESS , ⋯ |
| DeviceID_2 | MFP | ADDRESS , ⋯ |
| DeviceID_3 | PC | ADDRESS , ⋯ |
| DeviceID_5 | Mobile | ADDRESS , ⋯ |

APPARATUS, METHOD, AND COMPUTER-READABLE RECORDING MEDIUM FOR PROCESSING DATA

BACKGROUND OF THE INVENTION

1. Field of the Invention

The present invention relates to a method, an apparatus, and a computer-readable recording medium for processing data.

2. Description of the Related Art

There is a system that can execute a predefined workflow pertaining to image data of a document scanned by an image forming apparatus (e.g., Japanese Laid-Open Patent Publication No. 2008-97586). With this system, the workflow is defined, so that data can flow in a manner (style) complying with an operation (duty) of the user.

Basically, a single cycle of a workflow is completed by inputting of data, performing one or more processes on the input data, and outputting the data subjected to the one or more processes.

A task flow of a user may not be simple enough to be completed by performing a single cycle of a workflow. For example, data that has been output by a given workflow may be edited by a user. Then, the edited data may be input to the same workflow or another workflow. That is, there may be a case in which a document is processed in a manner that an entity handling the document shifts from an entity that executes a workflow inside a system (virtual space) to a user that executes the workflow outside the system (real space), and shifts again to the entity that executes the workflow inside the system after the document has been processed by the user. In this case, improvement in the efficiency of processing the document is desired.

SUMMARY OF THE INVENTION

The present invention may provide a data processing system, a data processing apparatus, and a data processing method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing system, a data processing apparatus, and a data processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus including a first storage part configured to store information pertaining to an order in which multiple process flows are executed, the execution of the multiple process flows being started by input of data and terminated by output of the data in a format usable for a user, a reception part configured to receive input data with respect to one of the multiple process flows, an execution part configured to execute the one of the multiple process flows on the input data, and a second storage part configured to store information indicating the one of the multiple process flows executed by the execution part. The execution part is configured to identify a predetermined process flow that is to be executed with respect to the input data by referring to the first and the second storage parts. The predetermined process flow is a process flow that is to be performed earliest among the multiple process flows that are not yet executed.

Other objects, features and advantages of the present invention will become more apparent from the following detailed description when read in conjunction with the accompanying drawings.

BRIEF DESCRIPTION OF THE DRAWINGS

FIG. 8 is a schematic diagram illustrating a configuration of a flow-set definition storage part according to an embodiment of the present invention;

FIG. 9 is a schematic diagram illustrating a configuration of a progress management table corresponding to one flow set job according to an embodiment of the present invention;

FIG. 10 is a schematic diagram illustrating an example of a configuration of a flow table according to an embodiment of the present invention;

FIG. 11 is a schematic diagram illustrating an example of a configuration of a plug-in table according to an embodiment of the present invention; and FIG. 12 is a schematic diagram illustrating an example of a configuration of a device table according to an embodiment of the present invention.

DETAILED DESCRIPTION OF THE PREFERRED EMBODIMENTS

Figure 1:
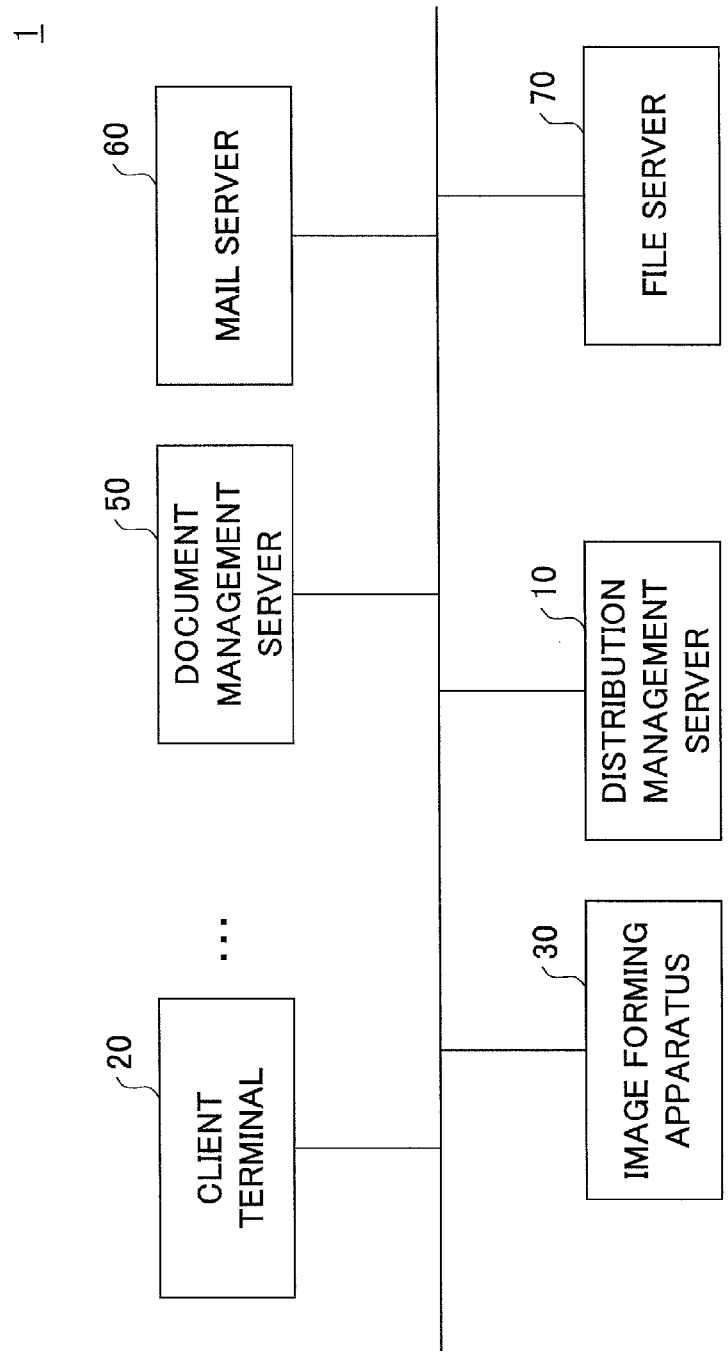
FIG. 1 is a schematic diagram illustrating a configuration of a distribution management system according to an embodiment of the present invention.

Next, embodiments of the present invention are described with reference to the accompanying drawings. FIG. 1 is a schematic diagram illustrating a configuration of a distribution management system 1 according to an embodiment of the present invention. The distribution management system 1 of FIG. 1 includes, for example, a distribution management server 10, one or more client terminals 20, one or more image forming apparatuses 30, a document management server 50, a mail server 60, and a file server 70. The terminals and apparatuses included in the distribution management system 1 are connected to each other via a wireless or wired network (e.g., LAN (Local Area Network), the Internet), so that the terminals and apparatus can perform communications.

The client terminal 20 is used to perform, for example, inputting (transmitting) of data to the distribution management server 10 or processing of data (e.g., referring of data, editing of data) that is output (transmitted) from the distribution management server 10. That is, in this embodiment, the client terminal 20 is an example of a source of data that is input to the distribution management server 10. The client terminal 20 of this embodiment is also an example of an output destination (distribution destination) of data that is output from the distribution management server 10 as a result of executing a work flow performed by the distribution management server 10. The client terminal 20 may be, for example, a mobile phone, a smartphone, a tablet type terminal, or a PC (Personal Computer).

The image forming apparatus 30 reads image data from a manuscript (original) and inputs (transmits) the image data to the distribution management server 10. Further, the image forming apparatus 30 performs printing or the like on data transmitted from the distribution management server 10. That is, in this embodiment, the image forming apparatus 30 is an example of a source of data that is input to the distribution management server 10. The image forming apparatus 30 of this embodiment is also an example of an output destination (distribution destination) of data that is output from the distribution management server 10 as a result of executing a work flow performed by the distribution management server 10.

The distribution management server 10 is a computer that performs a predefined workflow on data input thereto. The term "workflow" refers to a flow of processes (process flow) that is performed by an independent task or a given combination of tasks (process units) that achieve a completed function. In this embodiment, a workflow begins by inputting of data, and ends by the data being output in a form that can be used by a user. The term "process unit" may correspond to an "activity" of a given workflow.

The document management server 50 is a computer including a database for managing data in association with attribute data corresponding to the data. The document management server 50 is an example of a destination of data including the results of performing the workflow distributed (output) from the distribution management server 10. In this case, the distributed data is stored in the database of the document management server 50.

The mail server 60 includes a function of a common mail server. In this embodiment, the mail server 60 receives electronic mail destined (addressed) for a predetermined mail address (hereinafter "flow address") from the client terminal 20. The mail server 60 receives and stores the electronic mail by using a communication protocol such as SMTP (Simple Mail Transfer Protocol). The mail server 60 may receive a request to obtain the electronic mail destined for the flow address from the distribution management server 10. In response to the request from the distribution management server 10, the mail server 60 transmits the requested electronic mail stored therein to the distribution management server 10. The distribution management server 10 may use a communication protocol such as POP (Post Office Protocol) or IMAP (Internet Message Access Protocol) to obtain the electronic mail from the mail server 60. It is to be noted that the mail server 60 may also be a destination of data including the results of performing the workflow distributed (output) from the distribution management server 10. In the case where the mail server 60 is the distribution destination, the distributed data is attached to an electronic mail message and transferred to a mail address that is set to the workflow.

The file server 70 stores and manages files that are shared in the network. In this embodiment, the file server 70 is an example of a source of data that is input to the distribution management server 10. For example, a file that is stored in a predetermined folder of the file server 70 is transmitted to the distribution management server 10. It is to be noted that the file server 70 may also be a destination of data including the results of performing the workflow distributed (output) from the distribution management server 10. In a case where the file server 70 is the distribution destination, the distributed data is stored in a folder of the file server 70.

Figure 2:
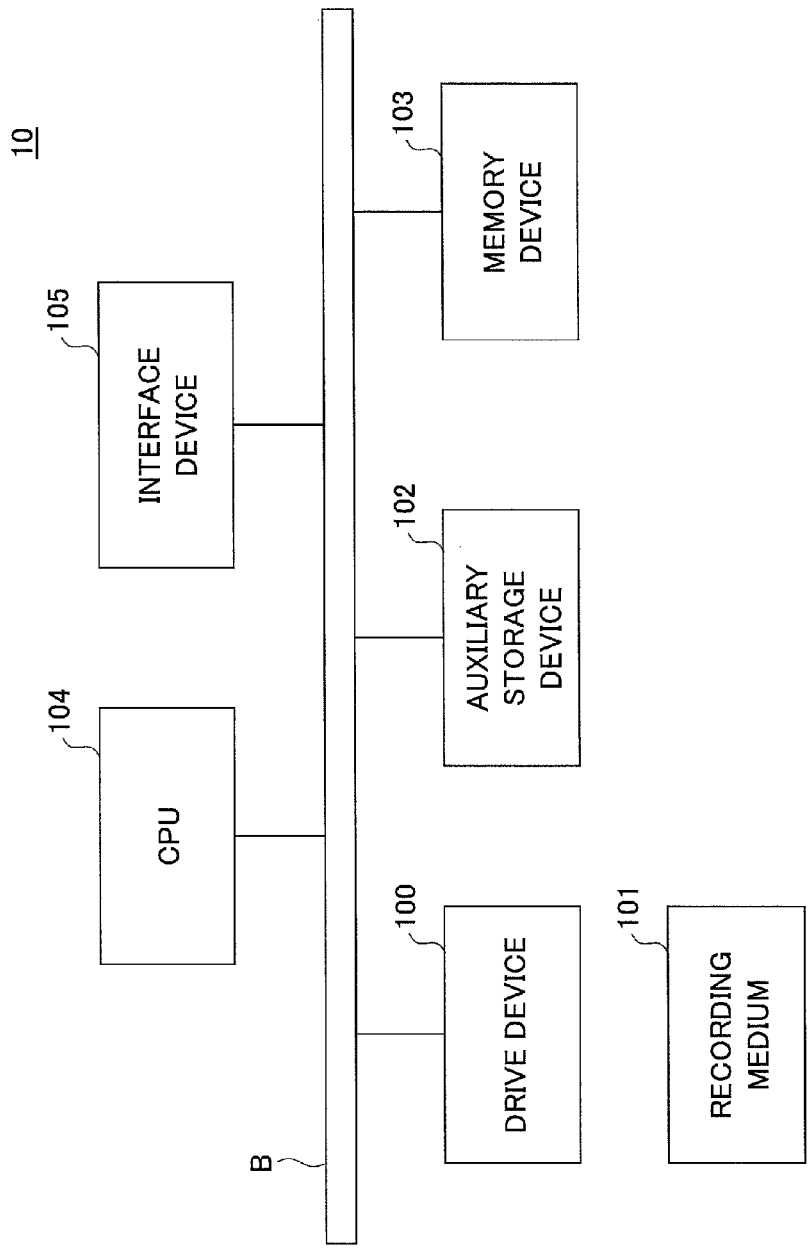
FIG. 2 is a schematic diagram illustrating a hardware configuration of a distribution management server according to an embodiment of the present invention.

FIG. 2 is a schematic diagram illustrating a hardware configuration of the distribution management server 10 according to an embodiment of the present invention. The distribution management server 10 of FIG. 2 includes, for example, a drive device 100, an auxiliary storage device 102, a memory device 103, a CPU 104, and an interface device 105 that are connected to each other by a bus B.

A program for implementing a process of the distribution management server 10 may be provided by a recording medium 101 (e.g., CD-ROM) on which the program is recorded. When the recording medium 101 stored with the program is set in the drive device 100, the program is installed from the recording medium 101 to the auxiliary storage device 102 via the drive device 100. It is, however, to be noted that the program may be installed from a device other than the recording medium 101. For example, the program may be downloaded from another computer via the network. The auxiliary storage device 102 stores the program therein along with, for example, necessary files and data.

When activation of the program is instructed, the memory device 103 reads out the program from the auxiliary storage device 102 and stores it therein. The CPU 104 executes a function(s) of the distribution management server 10 according to the program stored in the memory device 102. The interface device 105 is used as an interface for connecting the distribution management server 10 to the network.

It is to be noted that the distribution management server 10 may be constituted by multiple computers.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD-ROM, a magnetic tape device or a solid state memory device.

Figure 3:
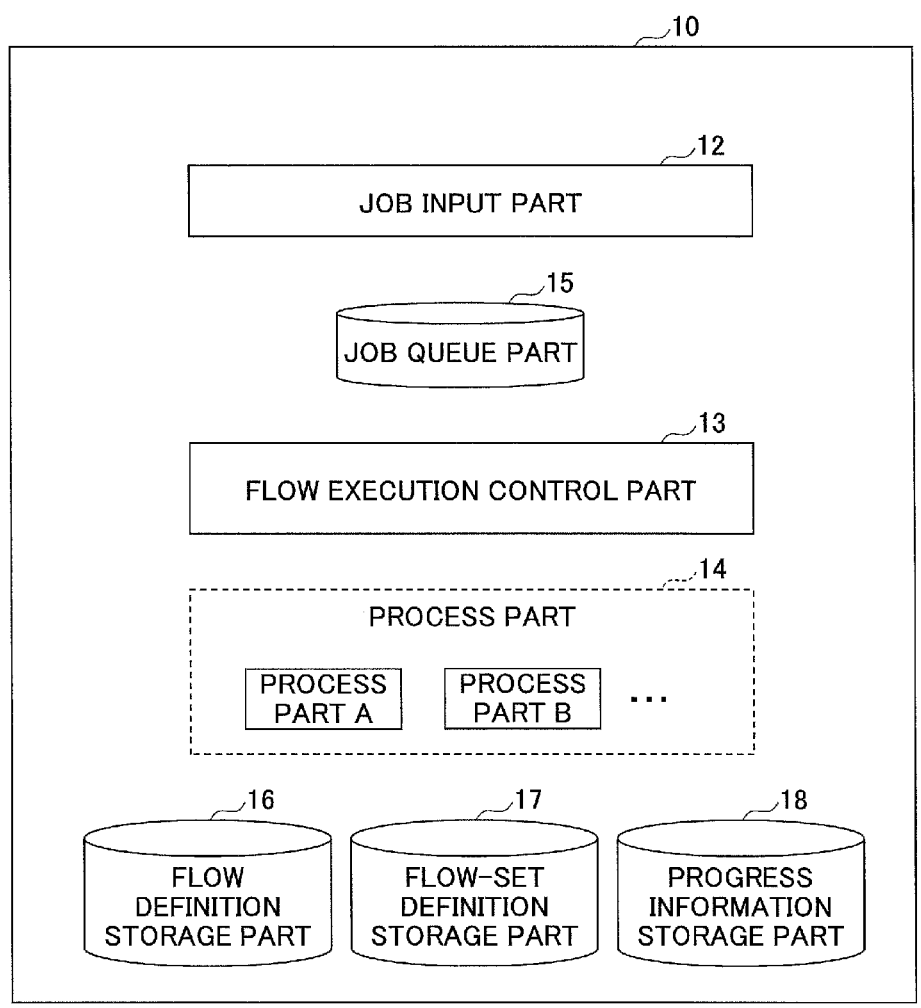
FIG. 3 is a schematic diagram illustrating a configuration of functions (function units) of a distribution management apparatus according to an embodiment of the present invention.

FIG. 3 is a schematic diagram illustrating a configuration of functions (function units) of the distribution management apparatus 10 according to an embodiment of the present invention. The distribution management apparatus 10 includes, for example, a job input part 12, a flow execution control part 13, and a process part 14. The functions of the job input part 12, the flow execution control part 13, and the process part 14 are implemented by the processes executed by the CPU 104 in accordance with the program installed in the distribution management server 10. The distribution management server 10 also includes a job queue part 15 and storage parts such as a flow definition storage part 16, a flow-set definition part 17, and a progress data storage part 18. The functions of the flow definition storage part 16, the flow-set definition part 17, and the progress information storage part 18 are implemented by using, for example, a storage device connected to the distribution management server 10 via the network. Alternatively, the memory device 103 may be used as the job queue part 15.

The flow definition storage part 16 stores flow definition data. The term "flow definition data" refers to data including definition information pertaining to, for example, the flow of the processes constituting a workflow. In this embodiment, a single flow definition data corresponds to a single workflow. Therefore, in a case where workflows include process operations (process procedures) that are different from each other, a flow definition data is created with respect to each of the workflows.

The flow-set definition storage part 17 stores definition data of workflow sets. The term "workflow set" is a concept pertaining to a combination of workflows that are arranged in order (workflow combination) or an order in which workflows are executed (execution order). Thus, the definition information of the workflow set includes information indicating the execution order of the workflows included in a workflow set.

The progress information storage part 18 stores progress information in correspondence with an execution unit of a workflow set (hereinafter also referred to as "flow set job"). More specifically, information indicating which one or more workflows have been executed is stored in correspondence with each flow set job.

The job input part 12 receives a request to execute a workflow and data or the like pertaining to the workflow and inputs job information pertaining to the workflow to the job queue part 15. In this embodiment, a "job" is a unit of a workflow that is executed. Thus, for example, in a case where the same workflow is executed multiple times, a job would be different each time the workflow is executed.

The job queue part 15 stores the job information input from the job input part 12. The job information includes, for example, identification information pertaining to a workflow or workflow set that is to be executed.

The flow execution control part 13 obtains job information from the job queue part 15 and controls the execution of a workflow or a workflow set in accordance with a flow definition data or definition information of a flow set that corresponds to the obtained job information.

The process part 14 executes processes in units of activities (process units) that constitute a workflow. For example, one activity is implemented by a single process part 14. Therefore, a workflow is implemented by connecting processes of one or more process parts 14 that implement processes different from each other. FIG. 3 illustrates process parts A and B as examples of the process part. Each of the process parts 14 may be implemented by independent (separate) programs modules that include processes executed by the CPU 104. The distribution management server 10 (CPU 104) and the program module that functions as the process part 14 may hereinafter also be referred to as "plug-in".

In this embodiment, one or more process units (activities) constituting a workflow that is executed by the distribution management server 10 can be mainly categorized into an input process, an intermediate process, and an output process. The input process is a process of inputting data pertaining to a workflow from an external device (e.g., the image forming apparatus 30, the mail server 60, or the file server 70).

The intermediate process is a process of processing target process data of a workflow (data to be processed). A noise canceling process, an OCR (Optical Character Recognition) process, a translation process, or a data conversion process are examples of the intermediate process.

The output process is a process of outputting data of a workflow in a format (mode) that can be used by the user. The outputting data in a "format that can be used by the user" not only includes outputting data in a format that can be directly used by the user (e.g., printing on a paper) but also includes outputting data in a format that can be used by the user by way of an application program or the like (e.g., electronically storing data). A process of distributing data to a folder of a document management server 50 is one example of the output process. The mail server 60 may be the destination for distributing the data. Alternatively, an image forming apparatus 30 into which image data is input (input source of image data) or another image forming apparatus 30 separate from the image forming apparatus 30 may be the destination to which the image data is distributed (destination image forming apparatus). In this case, the data that is distributed is printed by the destination image forming apparatus).

It is to be noted that the process part 14 of FIG. 3 executes the intermediate process or the output process whereas the job input part 12 of FIG. 3 executes the input process. Various external devices may serve as input sources from which data is input to the distribution management server 10. Further, the method for inputting data to the distribution management server 10 (i.e. method for obtaining or receiving data from the standpoint of the distribution management server 10) may be different for each of the external devices. In order to flexibly adapt to the different input methods, the job input part 12 may have, for example, a configuration illustrated in FIG. 4.

Figure 4:
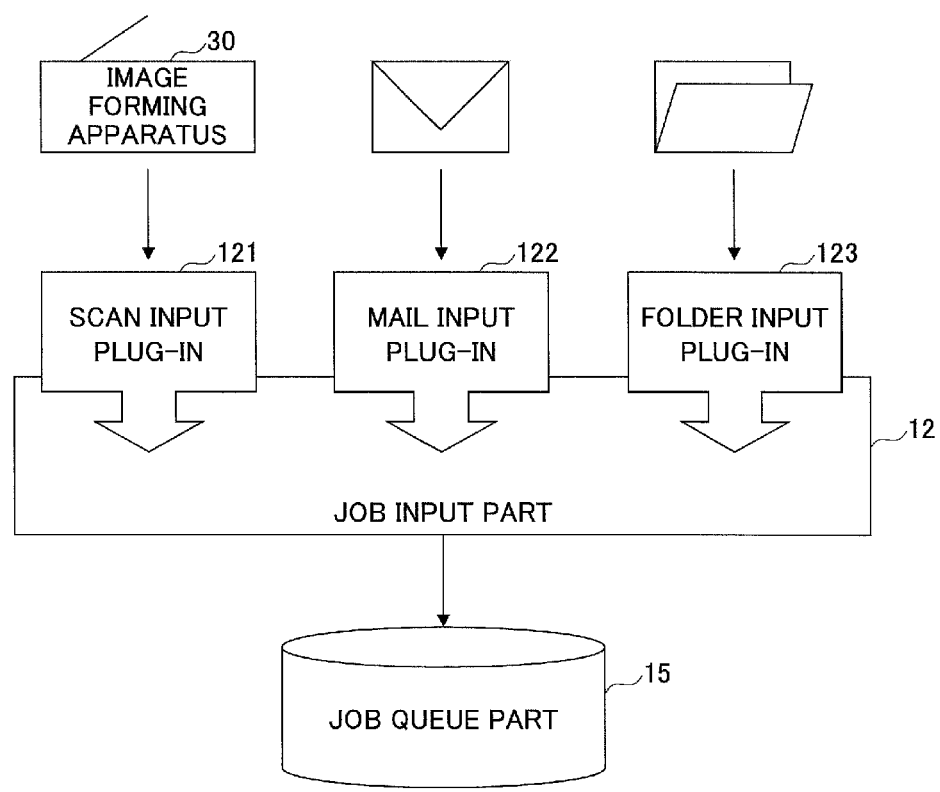
FIG. 4 is a schematic diagram illustrating a configuration of a job input part according to an embodiment of the present invention.

FIG. 4 is a schematic diagram illustrating a configuration of the job input part 12 according to an embodiment of the present invention. Similar to the process part 14, the exchange (input/output of data) between the job input part 12 and the distribution management server 10 may be implemented by a plug-in (program module capable of plug-in). FIG. 4 illustrates a scan input plug-in 121, a mail input plug-in 122, and a folder input plug-in 123 as examples of the plug-in.

The scan input plug-in 121 is a plug-in that receives input data from the image forming apparatus 30. That is, the scan input plug-in 121 receives scanned image data from the image forming apparatus 30 as data to be input from the image forming apparatus 30. The scan input plug-in 121 also receives a flow ID or a flow set ID from the image forming apparatus 30 together with the scanned image data. The scan-input plug-in 121 modifies (transforms) the received image data and the flow ID or the flow set ID into job information having a format expected by the flow execution control part 13 and stores the modified data in the job queue part 15. It is to be noted that the term "flow ID" refers to identification information of each definition of a flow (i.e., each flow definition data), and the term "flow set ID" refers to identification information of each workflow set.

The mail input plug-in 122 is a plug-in that receives data to be input to a workflow by way of an electronic mail message destined for a flow address. More specifically, data attached to an electronic mail is assumed as input data with respect to a workflow (i.e. data to be input to a workflow). The input data may be image data or data of other formats. The mail input plug-in 122 modifies (transforms) the data attached to the electronic mail message and information written in the electronic mail message into job information having a format expected by the flow execution control part 13 and stores the modified data in the job queue part 15. The information written in the electronic mail message may include, for example, a flow ID or a flow set ID. The flow addresses may be assigned in correspondence with each flow ID or each flow set ID. In this case, the flow ID or the flow set ID serves to identify the flow address corresponding to the electronic mail message.

The folder input plug-in 123 is a plug-in that obtains data to be input to a workflow from data (file) stored in a predetermined folder. For example, the folder input plug-in 123 performs polling on a predetermined folder to determine whether the folder includes a file that stores data and a folder ID or folder set ID therein. In a case where the data and the folder ID or the folder set ID are stored in the file, the folder input plug-in 123 obtains the data and the file. The folder input plug-in 123 modifies (transforms) the obtained data and the information stored in the obtained file into job information having a format expected by the flow execution control part 13 and stores the modified data (job information) in the job queue part 15. The predetermined folder may be assigned in correspondence with each flow ID or each flow set ID. In this case, the flow ID or the flow set ID can be identified depending on the folder in which the data is stored. The predetermined folder may be a folder provided in the auxiliary storage device 102 of the distribution management server 10. Alternatively, the predetermined folder may be a folder provided in a storage device connected to the distribution management server 10 via the network (e.g., a storage device of one of the client terminals 20 or a storage device of the document management server 50).

It is, however, to be noted that a plug-in using an input method besides the input methods used by the above-described plug-ins may also be added as one of the plug-ins for the job input part 12. For example, a plug-in that receives input data via a Web page may be added.

In this embodiment, an input process, an intermediate process, and an output process are implemented by plug-ins respectively. Accordingly, variations of a definable workflow can be increased by creating and adding a plug-in that executes a desired process.

Next, a supposed operation flow according to an embodiment of the present invention is described. In this embodiment, "operation flow" refers to, for example, the flow of a document used for an operation (duty) in an office.

Figure 5:
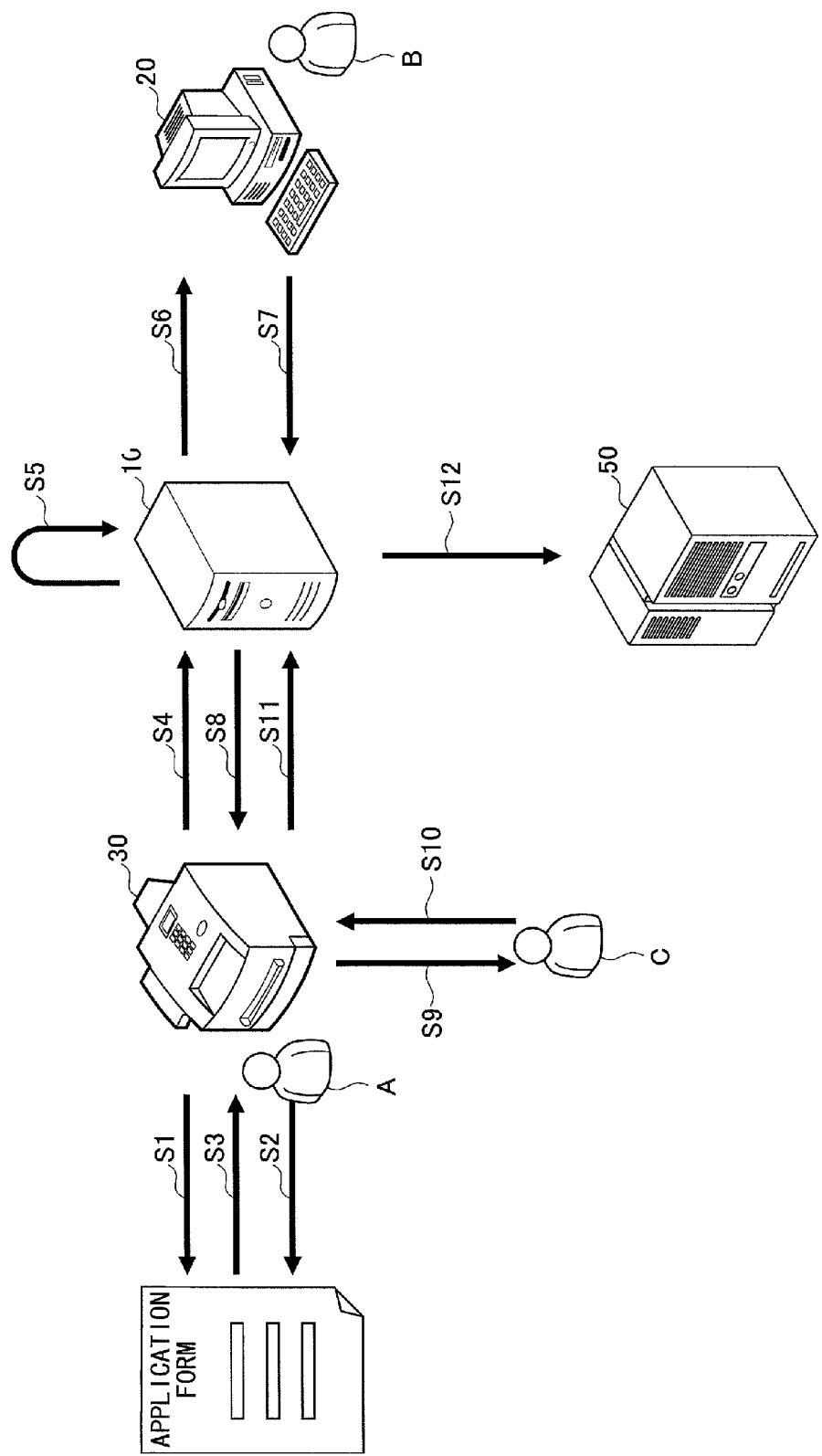
FIG. 5 is a schematic diagram illustrating an operation flow according to an embodiment of the present invention.

FIG. 5 is a schematic diagram illustrating an operation flow according to an embodiment of the present invention. FIG. 5 illustrates an operation flow pertaining to an application form.

First, an applicant A stores application form data (document data indicating a format of an application) in a predetermined folder in the file server 70 and instructs the image forming apparatus 30 to print the application form data (Step S1). As a result, a sheet of the application form is output from the image forming apparatus 30.

Then, the applicant A fills out necessary items on the printed application form (Step S2) and scans the application form with the image forming apparatus 30 (Step S3). The image forming apparatus 30 transmits the scanned image data of the application form to the distribution management server 10 (Step S4).

The distribution management server 10 performs an OCR process on the image data (Step S5). As a result, the filled out items of the application form are output as text data. The distribution management server 10 transmits an electronic mail message with the text data attached to a mail address of an inspector B (Step S6). The inspector B browses the electronic mail message to determine (inspect) whether there are any errors in the text data obtained by the OCR process. In a case where an error is found in the text data, the inspector B corrects the part of the text data that includes the error. After the inspecting process is completed, the inspector B transmits an electronic mail message with the corrected text data attached to a predetermined flow address (Step S7).

The distribution management server 10 transmits the text data to the image forming apparatus 30 (Step S8). The image forming apparatus 30 prints the text data of the application form (Step S9). An authorizing person C refers to the printed application form and signs the application form if the application form is approvable, and scans the signed application form with the image forming apparatus 30 (Step S10). The image forming apparatus 30 transmits the scanned image data of the application form to the distribution management server 10 (Step S11). The distribution management server 10 transmits the image data to the document management server 50 (Step S12). As a result, the image data is registered (stored) in the document management server 50. It is to be noted that the distribution management server 10 may perform a predetermined image process on the image data to verify the validity of the signature of the authorizing person C before transmitting the image data to the document management server 50.

Figure 6:
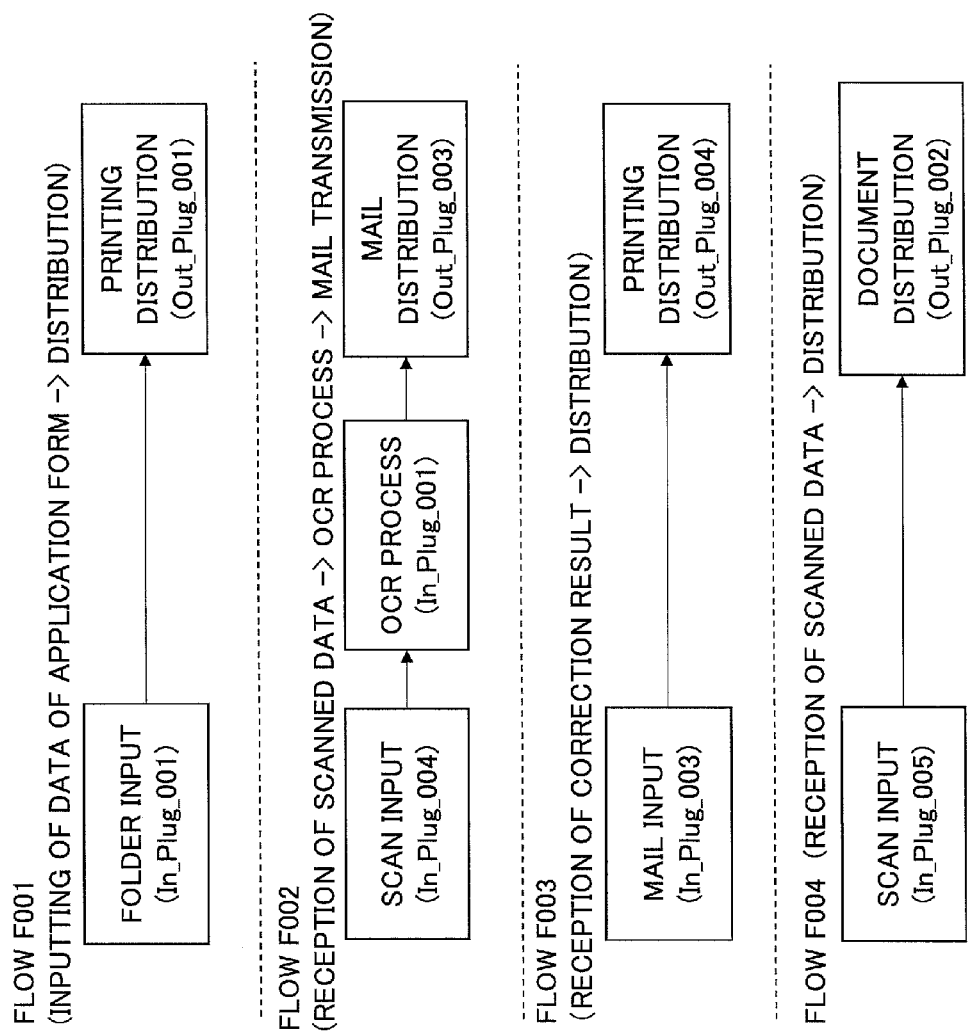
FIG. 6 is a schematic diagram illustrating an example of a combination of workflows for implementing an operation flow according to an embodiment of the present invention.

The operation flow illustrated in FIG. 5 can be implemented by a combination or collection of multiple workflows as illustrated in FIG. 6.

FIG. 6 is a schematic diagram illustrating an example of a combination of workflows for implementing an operation flow. FIG. 6 illustrates four workflows F001-F004. In each of the four workflows F001-F004 of FIG. 6, the rectangle on the left end indicates an input process, the rectangle on the right end indicates an output process, and the rectangle between the left and right end rectangles indicates an intermediate process. It is to be noted that the meaning of each of the identification information illustrated in the parentheses of the rectangles is described below.

The flow F001 is a workflow including processes of obtaining input data from application form data stored in a predetermined folder of the file server 70 (folder input process), distributing the application form data to the image forming apparatus 30, and instructing the image forming apparatus 30 to print the application form data (printing distribution process).

The flow F002 is a workflow including processes of receiving scanned image data of a sheet of a filled out application form (scan input process), performing an OCR process on the scanned image data, and transmitting an electronic mail message with text data attached (that is output as a result of the OCR process) to an electronic mail address of the inspector B (mail distribution process).

The flow F003 is a workflow including processes of receiving an electronic mail message attached with the text data (that is corrected by the inspector B) at the distribution management server 10 (mail input process), distributing the text data to the image forming apparatus 30, and printing the application form data with the image forming apparatus 30 (printing distribution process).

The flow F004 is a workflow including processes of receiving scanned image data of an application form signed by the authorizing person C (scan input process) and distributing the image data to the document management server 50 (document distribution process).

Thus, from the standpoint of the user, the flow of a single document (application form) can be divided into four workflows. The reason for dividing an operation flow into four workflows is because the intervention of the user in the real space makes it difficult to implement the single flow of the document inside the virtual space. That is, it is difficult to define the operation flow of FIG. 5 as a single workflow.

Thus, the user would need to be aware that there are four workflows with respect to a single application form and need to determine which of the workflows are to be executed depending on each operation. Therefore, in this embodiment, a workflow set can be defined for reducing the workload of the user. In the example of FIG. 6, the four workflows F001-F004 constitute a single workflow set.

Figure 7:
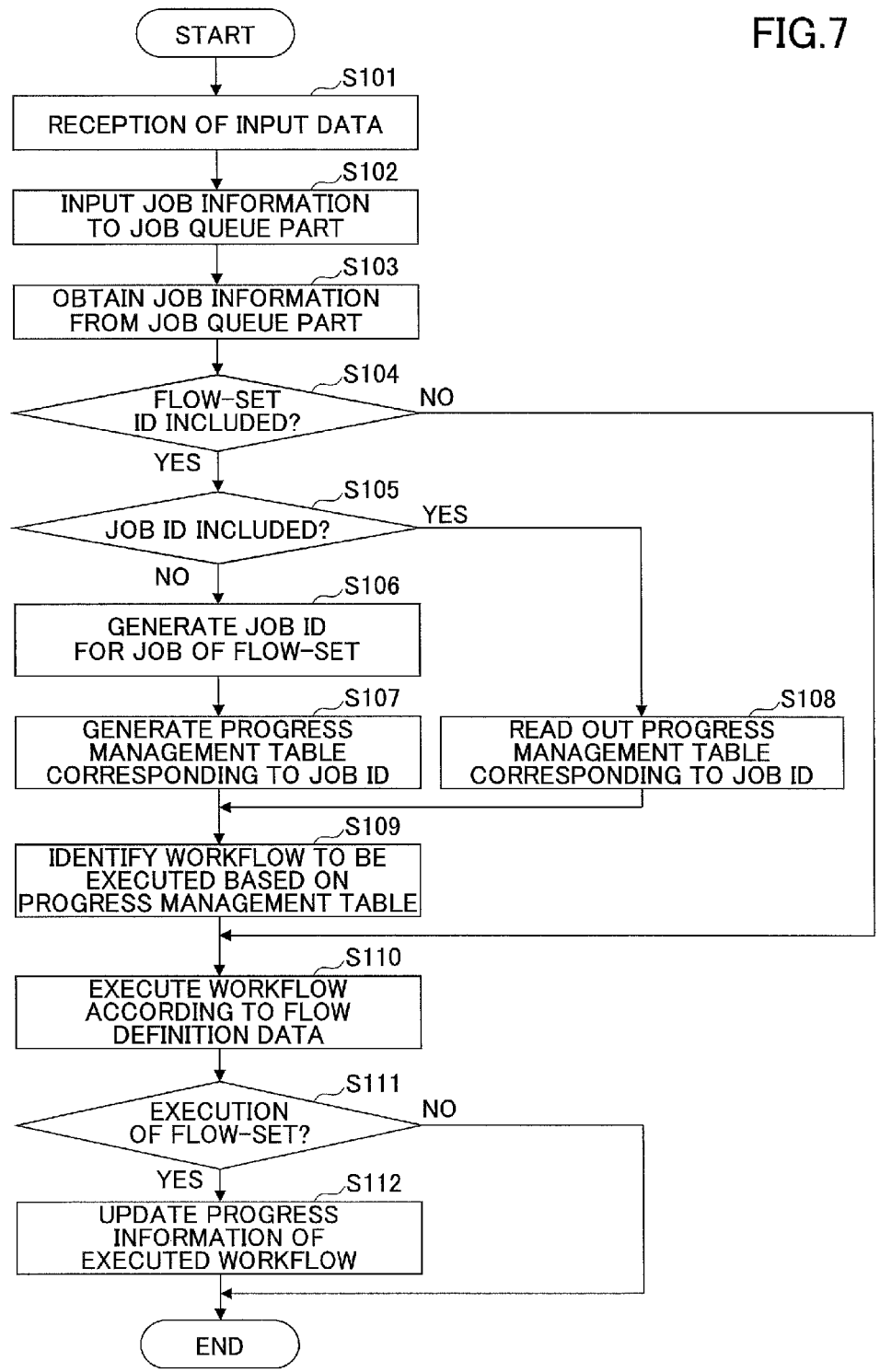
FIG. 7 is a flowchart for describing an example of a procedure of processes performed by a distribution management server according to an embodiment of the present invention.

Next, a procedure of processes performed by the distribution management server 10 is described. FIG. 7 is a flowchart for describing an example of a procedure of processes performed by the distribution management server 10.

When the job input part 12 receives, for example, input data, and a flow ID or a flow set ID (Step S101), job information including the received input data, and the flow ID or flow set ID is stored in the job queue part 15 (Step S102). In a case where execution of a workflow is requested, the job input part 12 receives the input data and the flow ID. In a case where execution of a workflow set is requested, the job input part 12 receives the input data and the flow set ID.

For example, in a case where Step S101 is a scan input process, the user inputs a flow ID corresponding to a workflow to be executed or a flow set ID corresponding a workflow set to be executed to the image forming apparatus 30 and scans an original of the application form or the like with the image forming apparatus 30. Then, the image forming apparatus 30 transmits the flow ID or the flow set ID together with the scanned image data to the distribution management server 10. The flow ID or the flow set ID, and the image data are received by way of the scan input plug-in 121.

In a case where Step S101 is a folder input process, the user stores input data in a predetermined folder. In addition, the user also stores a file written with a flow ID corresponding to a workflow to be executed or a flow set ID corresponding a workflow set to be executed in the predetermined folder. The folder input plug-in 123 obtains the input data and the flow ID or the flow set ID from the predetermined folder.

In a case where Step S101 is a mail input process, the user transmits an electronic mail message with input data attached to a flow address. In addition, a flow ID corresponding to a workflow to be executed or a flow set ID corresponding a workflow set to be executed is written in a predetermined format in the title or body of the electronic mail message. The mail input plug-in 122 inputs the input data, and the flow ID or flow set ID by obtaining the electronic mail message destined for the flow address from the mail server 60.

The order for performing the workflows constituting a workflow set may be set beforehand. Thus, when inputting input data and a flow set ID in a case where a workflow of a work flow set corresponding to the flow set ID (target flow set) is to be performed second or later among the workflows constituting the workflow set, a flow set job ID is input together with the input data. The "flow set job ID" is identification information assigned to each flow set job. A "flow set job" is a unit of a workflow set that is to be executed. In other words, in a case of performing a workflow that is to be performed first among the workflows of the target workflow set, the flow set job ID is not input. This is because the flow set job ID is assigned on condition that the first workflow is to be performed (described in detail below).

The flow execution control part 13 may, for example, periodically refer to the job queue part 15. In a case where job information is stored in the job queue part 15, the flow execution control part 13 extracts the job information from the job queue part (Step S103). Then, the flow execution control part 13 determines whether the flow set ID is included in the job information (Step S104). In a case where the flow set ID is included in the job information (Yes in Step S104), the flow execution control part 13 determines whether the flow set job ID is included in the job information (Step S105). That is, in Step S105, it is determined whether the job information is job information pertaining to a workflow to be performed second or later among the workflows of a target flow set.

In a case where the flow set job ID is not included in the job information (No in Step S105), the flow execution control part 13 generates a flow set job ID that corresponds to a flow set job (target flow set job) of a target flow set (Step S106).

Then, the flow execution control part 13 refers to the flow-set definition storage part 17, generates a progress management table that corresponds to the target flow set job, and stores the progress management table in the progress information storage part 18 (Step S107).

FIG. 8 is a schematic diagram illustrating a configuration of the flow-set definition storage part 17 according to an embodiment of the present invention. As illustrated in FIG. 8, the flow-set definition storage part 17 stores a flow set configuration in correspondence with each flow set ID. The "flow set configuration" includes flow IDs of the workflows that constitute a workflow set corresponding to a flow set ID. The flow IDs of the flow set configuration are arranged according to the order in which the workflows are performed. For example, a workflow set corresponding to a flow set ID indicated as "shinseisho" (application form) in FIG. 8 is defined to be a workflow set that performs the workflow F001, the workflow F002, the workflow F003, and the workflow F004 in this order.

FIG. 9 is a schematic diagram illustrating a configuration of the progress management table corresponding to one flow set job according to an embodiment of the present invention.

As illustrated in FIG. 9, the progress management table stores, for example, a flow ID and a status in correspondence with each of the workflows that constitute a target flow set. The "status" is information indicating the status of performing (executing) a workflow of a flow ID. For example, the values of the statuses of the progress management table may be "not executed", "executing", and "completed". The value of the status "not executed" indicates that a workflow is not yet executed. The value of the status "executing" indicates that a workflow is currently being executed. The value of the status "completed" indicates that execution of a workflow is completed.

In Step S107, the progress management table including records that can store statuses therein is generated. The statuses of the progress management table are stored in correspondence with each of the flow IDs stored in the flow-set definition storage part 17 with respect to the flow set ID of the target flow set. The records of the progress management table are arranged in an order complying with the order in which the workflows are executed (performed). The status "not executed" is stored as an initial value of each status of the records of the progress management table. It is to be noted that the generated progress management table is stored in association with the flow set job ID of the target flow set job.

On the other hand, in a case where the flow set job ID is included in the job information (Yes in Step S105), the flow execution control part 13 reads out the progress management table associated with the flow set job ID from the progress information storage part 18. That is, in a case where the job information pertains to a workflow that is executed second or later among the workflows constituting the target flow set, the progress management table associated with the flow set job ID is read out from the progress information storage part 18 (Step S108).

Then, the flow execution control part 13 identifies a workflow to be executed based on the progress management table generated in Step S107 or read out in Step S108 (Step S109). More specifically, the workflow that is identified is a workflow that has a status "not executed" and a flow ID corresponding to a workflow to be executed earliest (i.e. workflow having the earliest execution order among the workflows). It is to be noted that, in a case where a flow ID is included in the job information (Yes in Step S104), the flow ID is identified to be the flow ID of the workflow to be executed.

Then, the flow execution control part 13 controls the execution of the identified workflow in accordance with the flow definition data corresponding to the identified flow ID of the workflow (Step S110). When execution of the workflow is started, the flow execution control part 13 updates the progress management table (see FIG. 9) associated with the flow set job ID of the target flow set job. More specifically, the flow execution control part 13 updates the status corresponding to the flow ID of the workflow that is started from "not executed" to "executing".

In this embodiment, the flow definition data includes, for example, a flow table, a plug-in table, and a device table.

FIG. 10 is a schematic diagram illustrating an example of a configuration of the flow table. As illustrated in FIG. 10, the flow table stores, for example, a flow configuration in correspondence with each flow ID. The "flow configuration" includes identification information of the plug-ins (plug-in IDs) that execute each unit of the processes of a workflow corresponding to the flow ID. The plug-in IDs are arranged according to the order in which the processes of a workflow are performed. In this embodiment, for the sake of convenience, the plug-in ID of a plug-in pertaining to an input process starts with "In" (see FIG. 10). The plug-in ID of a plug-in pertaining to an intermediate process starts with "Con". The plug-in ID of a plug-in pertaining to an output process starts with "Out". It is to be noted that a plug-in ID may also indicate a plug-in itself.

The flow-ID of FIG. 10 corresponds to the identification information (identification number) of each workflow illustrated in FIG. 6. Further, the plug-in IDs of the plug-ins of FIG. 10 are illustrated in the parentheses of corresponding rectangles of FIG. 6.

The flow execution control part 13 instructs each plug-in to execute each of the corresponding processes in the order indicated in the flow configuration corresponding to the identified flow ID. Each of the plug-ins refers to a plug-in table and a device table when executing a corresponding process.

FIG. 11 is a schematic diagram illustrating an example of a configuration of a plug-in table. As illustrated in FIG. 11, the plug-in table stores, for example, a plug-in ID, a plug-in type, setting information, and a device ID in correspondence with each plug-in.

The "plug-in type" indicates a type of process executed by a plug-in. The "setting information" indicates setting information of a plug-in. In a case where a plug-in requires to communicate with an external apparatus, the "device ID" indicates identification information of the external apparatus. Detailed information of each external apparatus is stored in the device table.

FIG. 12 is a schematic diagram illustrating an example of a configuration of the device table. As illustrated in FIG. 12, the device table stores, for example, a device type and device information in correspondence with each device ID. The "device type" indicates the type of an external apparatus. The "device information" mainly indicates information required for enabling a plug-in to communicate with an external apparatus.

In a case where the flow execution control part 13 instructs each plug-in to execute a process, each plug-in executes a corresponding process based on setting information that is stored in the plug-in table in correspondence with the plug-in ID of each plug-in.

In a case where the plug-in type of a plug-in is "scan input", the setting information of the plug-in is transferred to the image forming apparatus 30 that scans an image for input according to a workflow including a process corresponding to the plug-in. The image forming apparatus 30 uses the transferred setting information to perform a scanning process. More specifically, the image forming apparatus 30 performs scanning based on scan settings included in the setting information of the plug-in. The setting information of the plug-in may be transferred to the image forming apparatus 30 in response to input of a flow ID of a target workflow (workflow to be executed) or a flow set ID of a target work flow (workflow set to be executed) by way of an operation panel of the image forming apparatus 30. That is, when the flow ID or the flow set ID is input to the image forming apparatus 30, the image forming apparatus 30 requests the distribution management server 10 to obtain setting information of a plug-in of a process (in this example, scan input process) of a target workflow corresponding to the flow ID or the flow set ID. Accordingly, the distribution management server 10 transmits the setting information in response to the request from the image forming apparatus 30.

In a case where a workflow is executed as a part of a workflow set, the plug-in, which is to execute an output process of the workflow, outputs a flow set job ID of a target flow set in a style (manner) corresponding to the type of the output process. Alternatively the flow execution control part 13 may provide (notify) a flow set job ID to the plug-in.

For example, in a case where the type of the output process is "printing distribution", the flow set job ID may be printed on a recording paper (e.g., sheet of an application form). In a case where the type of the output process is "mail distribution", the flow set job ID may be written in an electronic mail message to be transmitted.

Accordingly, a flow set job ID of a workflow set can be provided (notified) to the user that instructs execution of each workflow constituting the workflow set.

In a case of a workflow that is to be executed second or later among the workflows of a workflow set, the user can input a flow set ID of the workflow in the following manner (style).

In a case of performing a scan input process, the user inputs a flow set ID and a flow set job ID. In this case, the image forming apparatus 30 transmits input data (scanned image data), the flow set ID, and the flow set job ID to the distribution management server 10. The scan input plug-in 121 stores job information including the image data, the flow set ID, and the flow set job ID transmitted from the image forming apparatus 30 into the job queue part 15.

In a case of performing a mail input process, the user attaches input data to an electronic mail message and writes a flow set ID or a flow set job ID of a predetermined format in the electronic mail message. The mail input plug-in 122 extracts the flow set ID and the flow set job ID from the electronic mail message and stores job information including the image data, the flow set ID, and the flow set job ID into the job queue part 15.

In a case where the flow set job ID is a unique ID that crosses over multiple types of workflow sets, a process of inputting a flow set ID may be omitted when inputting a flow set job ID during a process of inputting input data with respect to a workflow. In this case where a flow set job ID is included in flow information, it may be assumed that a flow set ID is included in the job information (Yes in Step S104).

When execution of a workflow is completed, the flow execution control part 13 determines whether the executed workflow is a workflow that constitutes a workflow set (Step S111). In a case where a flow set job is included in the job information or a flow set job is generated, the executed workflow is determined to be a workflow that constitutes a workflow set.

In a case where the executed workflow is a workflow that constitutes a workflow set (Yes in Step S111), the flow execution control part 13 updates the progress management table (see FIG. 9) associated with the flow set job ID of the target flow set job (Step S112). More specifically, the flow execution control part 13 updates the status corresponding to the flow ID from "executing" to "completed".

For example, in the case of executing a workflow set "shinseisho" (application form) which is a combination (collection) of workflows as illustrated in FIGS. 6 and 8, the applicant A stores the input data and a file written with the flow set ID "shinseisha" (applicant) into a predetermined folder. As a result, the processes illustrated in FIG. 7 are performed for the workflow F001. In the execution of the workflow F001, the progress management table is generated with respect to the flow set job of the workflow set "shinseisho", and the status of the workflow F001 is updated to "completed". Further, a flow set job ID of the flow set job and data of the application form are printed on a printing paper together with the data of the application form.

Then, the applicant A inputs the flow set job ID to the image forming apparatus 30 and instructs the image forming apparatus 30 to scan a sheet(s) of the application form. Then, the image forming apparatus 30 scans the application form and transmits the scanned image data and the flow set job ID to the distribution management server 10. The flow execution control part 13 of the distribution management server 10 determines that a workflow F002 is to be executed by referring to the progress management table associated with the flow set job ID. Accordingly, the processes of Step S110 and after of FIG. 7 are performed for the workflow F002. As a result, the status of the workflow F002 of the progress management table is updated to "completed". Further, the flow set job ID and the text data (OCR process result) are notified to the inspector B by way of electronic mail.

Then, the inspector B corrects an error if any in the text data and attaches the corrected text data to an electronic mail message. The inspector B also writes a flow set job ID in the electronic mail message. Accordingly, the inspector B transmits the electronic mail message to a flow address. Then, the flow execution control part 13 of the distribution management server 10 determines that a workflow F003 is to be executed by referring to the progress management table associated with the flow set job ID. Accordingly, the processes of Step S110 and after of FIG. 7 are performed for the workflow F003. As a result, the status of the workflow F003 of the progress management table is updated to "completed". Further, the flow set job ID and data of the application form are printed on a printing paper. Accordingly, the authorizing person C can recognize the flow set job ID by referring to the printed application form.

Then, the authorizing person C signs the printed application form, inputs the flow set job ID to the image forming apparatus 30, and instructs the image forming apparatus 30 to scan the signed application form. The image forming apparatus 30 scans the application form and transmits the scanned image data of the application form and the flow set job ID to the distribution management server 10. The flow execution control part 13 of the distribution management server 10 determines that a workflow F004 is to be executed by referring to the progress management table associated with the flow set job ID. Accordingly, the processes of Step S110 and after of FIG. 7 are performed for the workflow F002. As a result, the status of the workflow F004 of the progress management table is updated to "completed". Further, the image data of the application form is registered in the document management server 50.

Hence, with the above-described embodiment of the present invention, a single operation flow, which is divided into multiple workflows by one or more processes performed in the real space, can be defined as a single workflow set. Further, the user, who inputs input data for each workflow constituting a workflow set, needs only to input a flow set ID output in a prior workflow and does not need to input the flow ID. Accordingly, each user does not need to be strictly aware of which workflow is to be executed. As a result, the efficiency of handling a document can be improved.

Further, even in a case where flow set jobs corresponding to the same flow set ID are executed in parallel, the distribution management server 10 can identify a subsequent workflow (workflow to be executed next) with respect to each flow set job because the progress management table is generated in correspondence with each flow set job.

In the above described embodiment of the present invention, the distribution management server 10 is an example of a data process apparatus. The job input part 12 is an example of a reception part. The flow execution control part 13 is an example of an execution part. The flow-set definition storage part 17 is an example of a first storage part. The progress information storage part 18 is an example of the second storage part. The workflow is an example of a process flow.

The present invention is not limited to the specifically disclosed embodiments, and variations and modifications may be made without departing from the scope of the present invention.

The present application is based on and claims the benefit of priority of Japanese Priority Application No. 2013-192243 filed on Sep. 17, 2013, with the Japanese Patent Office, the entire contents of which are hereby incorporated by reference.

What is claimed is:

1. A data processing apparatus comprising:
a first storage part configured to store information pertaining to an order in which multiple process flows are executed, the execution of the multiple process flows being started by input of data and terminated by output of the data in a format usable for a user;
a reception part configured to receive input data with respect to one of the multiple process flows;
an execution part configured to execute the one of the multiple process flows on the input data; and
a second storage part configured to store information indicating the one of the multiple process flows executed by the execution part;
wherein the execution part is configured to identify a predetermined process flow that is to be executed with respect to the input data by referring to the first and the second storage parts,
wherein the predetermined process flow is a process flow that is to be executed earliest among the multiple process flows that are not yet executed,
wherein the reception part is configured to receive identification information of a process unit that constitutes a combination of the multiple process flows,
wherein the second storage part is configured to store the identification information in correspondence with information indicating a process flow that is executed on the input data in association with the identification information,
wherein the execution part is configured to identify information stored in the second storage part by referring to identification information received by the reception part, the information pertaining to a process flow to be executed earliest among the multiple process flows that are not yet executed, wherein the execution part is configured to output identification information of each of plural of the process units that constitutes a combination of the multiple process flows.

2. A data processing method comprising the steps of:

storing, by a first storage part, information pertaining to an order in which multiple process flows are executed, the execution of the multiple process flows being started by input of data and terminated by output of the data in a format usable for a user;

receiving input data with respect to one of the multiple process flows;

executing the one of the multiple process flows on the input data; and storing, by a second storage part, information indicating the one of the multiple process flows executed in the executing step;

wherein the executing step includes identifying a predetermined process flow that is to be executed with respect to the input data by referring to the first and the second storage parts, wherein the predetermined process flow is a process flow that is to be executed earliest among the multiple process flows that are not yet executed, wherein the receiving step includes receiving identification information of a process unit that constitutes a combination of the multiple process flows, wherein the second storage part is configured to store the identification information in correspondence with information indicating a process flow that is executed on the input data in association with the identification information, wherein the executing step includes identifying information stored in the second storage part by referring to identification information received in the receiving step, the information pertaining to a process flow to be executed earliest among the multiple process flows that are not yet executed, wherein the executing step includes outputting identification information of each of plural of the process units that constitutes a combination of the multiple process flows.

3. A non-transitory computer-readable recording medium on which a program is recorded for causing a computer to execute a data processing method, the data processing method comprising the steps of:

storing, by a first storage part, information pertaining to an order in which multiple process flows are executed, the execution of the multiple process flows being started by input of data and terminated by output of the data in a format usable for a user;

receiving input data with respect to one of the multiple process flows;

executing the one of the multiple process flows on the input data; and storing, by a second storage part, information indicating the one of the multiple process flows executed in the executing step;

wherein the executing step includes identifying a predetermined process flow that is to be executed with respect to the input data by referring to the first and the second storage parts, wherein the predetermined process flow is a process flow that is to be executed earliest among the multiple process flows that are not yet executed, wherein the receiving step includes receiving identification information of a process unit that constitutes a combination of the multiple process flows, wherein the second storage part is configured to store the identification information in correspondence with information indicating a process flow that is executed on the input data in association with the identification information, wherein the executing step includes identifying information stored in the second storage part by referring to identification information received in the receiving step, the information pertaining to a process flow to be executed earliest among the multiple process flows that are not yet executed, wherein the executing step includes outputting identification information of each of plural of the process units that constitutes a combination of the multiple process flows.

4. The data processing apparatus as claimed in claim 1, wherein the execution part is configured to determine whether the identification information is received by the reception part when the input data with respect to one of the multiple process flows is received by the reception part, and generate the identification information when the execution part determines that the identification information is not received.

5. The data processing apparatus as claimed in claim 1, wherein the second storage part is configured to store status of each of the multiple process flows in accordance with the identification information, the status information corresponding to one process flow indicating whether all processes of the one process flow included in the multiple process flows has been executed.

6. The data processing method as claimed in claim 2, wherein the executing step includes determining whether the identification information is received in the receiving step when the input data with respect to one of the multiple process flows is received in the receiving step, and generating the identification information when the identification information is determined to not be received.

7. The data processing method as claimed in claim 2, wherein the storing step includes storing status of each of the multiple process flows in accordance with the identification information, the status information corresponding to one process flow indicating whether all processes of the one process flow included in the multiple process flows has been executed.

8. The non-transitory computer-readable recording medium as claimed in claim 3, wherein the executing step includes determining whether the identification information is received in the receiving step when the input data with respect to one of the multiple process flows is received in the receiving step, and generating the identification information when the identification information is determined to not be received.

9. The non-transitory computer-readable recording medium as claimed in claim 3, wherein the storing step includes storing status of each of the multiple process flows in accordance with the identification information, the status information corresponding to one process flow indicating whether all processes of the one process flow included in the multiple process flows has been executed.

* * * * *